(12) United States Patent
Gioffre

(10) Patent No.: US 12,729,756 B2
(45) Date of Patent: Sep. 8, 2026

(54) DUAL CLUTCH TRANSMISSION ARCHITECTURE FOR AGRICULTURAL VEHICLES

(71) Applicant: CNH INDUSTRIAL ITALIA S.P.A., Turin (IT)

(72) Inventor: Luigi Gioffre, Turin (IT)

(73) Assignee: CNH INDUSTRIAL ITALIA S.P.A., Turin (IT)

( * ) Notice: Subject to any disclaimer, the term of this patent is extended or adjusted under 35 U.S.C. 154(b) by 45 days.

(21) Appl. No.: 18/841,944

(22) PCT Filed: Mar. 1, 2023

(86) PCT No.: PCT/EP2023/055171
§ 371 (c)(1),
(2) Date: Aug. 27, 2024

(87) PCT Pub. No.: WO2023/166050
PCT Pub. Date: Sep. 7, 2023

(65) Prior Publication Data

US 2025/0215963 A1 Jul. 3, 2025

(30) Foreign Application Priority Data

Mar. 1, 2022 (IT) ........................ 102022000003782

(51) Int. Cl.
*F16H 3/093* (2006.01)
*F16H 37/04* (2006.01)
*F16H 3/00* (2006.01)

(52) U.S. Cl.
CPC ........... *F16H 37/043* (2013.01); *F16H 3/093* (2013.01); *F16H 3/006* (2013.01); *F16H 2037/044* (2013.01); *F16H 2200/0078* (2013.01)

(58) Field of Classification Search
CPC .. F16H 3/092; F16H 37/043; F16H 2037/044; F16H 3/0006; F16H 2200/0078
See application file for complete search history.

(56) References Cited

U.S. PATENT DOCUMENTS 3,916,714 A 11/1975 Sisson et al.
8,429,992 B2 4/2013 Braford
(Continued)

FOREIGN PATENT DOCUMENTS

CN 207661120 U * 7/2018
EP 3 690 282 B1 8/2020
(Continued)

OTHER PUBLICATIONS

International Search Report and Written Opinion for PCT/EP2023/055171 dated May 22, 2023.

*Primary Examiner* — William C Joyce
(74) *Attorney, Agent, or Firm* — Foley & Lardner LLP

(57) ABSTRACT

Architectures, systems, and methods for a dual clutch transmission, including an input shaft, output shaft, input stage, gear ratio stage, range gear ratio stage, forward clutch, and rearward clutch. The dual clutch transmission includes an intermediate shaft between the gear ratio stage and the range gear ratio stage and carrying a third plurality of gears to engage a first and second plurality of gears to provide a predetermined gear ratio between the input shaft and intermediate shaft. The range gear ratio stage includes a support shaft coupled to the output shaft and carrying a plurality of range gears to engage one or more of the third plurality of gears. The plurality of range gears carried in a rotatably free manner with respect to the support shaft and one or more freely rotatable gears of the third plurality of gears supported in a rotatably free manner on the intermediate shaft.

20 Claims, 7 Drawing Sheets

(56) References Cited

U.S. PATENT DOCUMENTS

| | | | |
|---|---|---|---|
| 8,499,657 | B2 | 8/2013 | Sasada et al. |
| 8,596,157 | B2 | 12/2013 | Vu |
| 2018/0372188 | A1 | 12/2018 | Hana et al. |
| 2020/0393020 | A1 | 12/2020 | Bulgrien et al. |
| 2020/0400216 | A1 | 12/2020 | Sedoni et al. |

FOREIGN PATENT DOCUMENTS

| | | | |
|---|---|---|---|
| WO | WO-2019/091953 | A1 | 5/2019 |
| WO | WO-2020/148452 | A1 | 7/2020 |

* cited by examiner 3
30"
30
23
30'
25
25'
24
21IV
21III
22III
25"
21II
25'
25
C
21I
25"
22II
24
24
25
25'
20
25"
24
22I
14IV
15IV
17
17
14III
15III
14II
15II
17
17
14I
15I
12
11
B
7
10'
9
10"
8
5
4'
4c
6
4a
4
2
4b
A

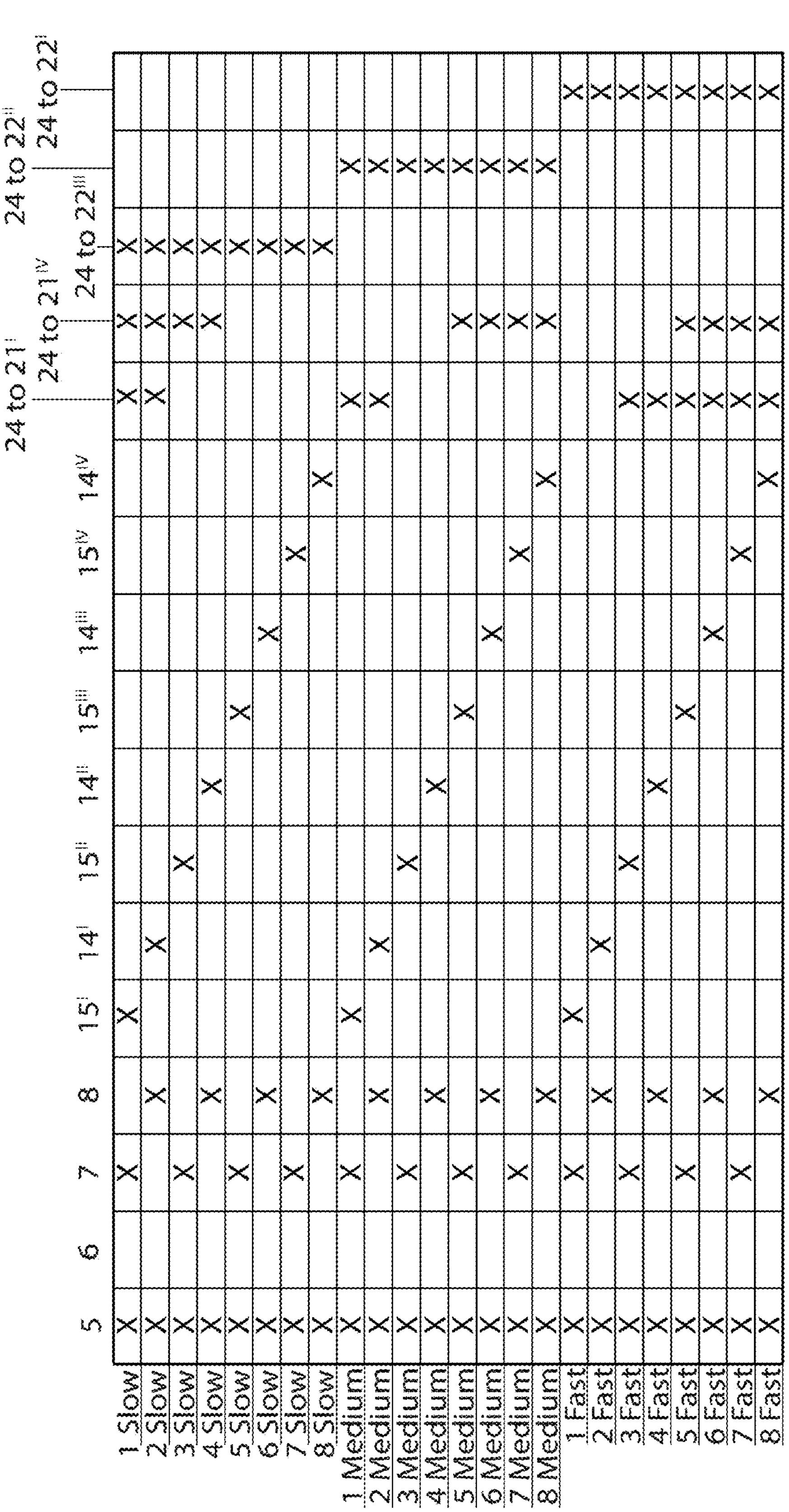

| | 5 | 6 | 7 | 8 | $15^{i}$ | $14^{i}$ | $15^{ii}$ | $14^{ii}$ | $15^{iii}$ | $14^{iii}$ | $15^{IV}$ | $14^{IV}$ | 24 to $21^{i}$ | 24 to $21^{IV}$ | 24 to $22^{iii}$ | 24 to $22^{ii}$ | 24 to $22^{i}$ |
|---|---|---|---|---|---|---|---|---|---|---|---|---|---|---|---|---|---|
| 1 Slow | X | | X | | X | | | | | | | | X | X | X | | |
| 2 Slow | X | | | X | | X | | | | | | | X | X | X | | |
| 3 Slow | X | | X | | | | X | | | | | | | X | X | | |
| 4 Slow | X | | | X | | | | X | | | | | | X | X | | |
| 5 Slow | X | | X | | | | | | X | | | | | | X | | |
| 6 Slow | X | | | X | | | | | | X | | | | | X | | |
| 7 Slow | X | | X | | | | | | | | X | | | | X | | |
| 8 Slow | X | | | X | | | | | | | | X | | | X | | |
| 1 Medium | X | | X | | X | | | | | | | | X | | | X | |
| 2 Medium | X | | | X | | X | | | | | | | X | | | X | |
| 3 Medium | X | | X | | | | X | | | | | | | | | X | |
| 4 Medium | X | | | X | | | | X | | | | | | | | X | |
| 5 Medium | X | | X | | | | | | X | | | | | X | | X | |
| 6 Medium | X | | | X | | | | | | X | | | | X | | X | |
| 7 Medium | X | | X | | | | | | | | X | | | X | | X | |
| 8 Medium | X | | | X | | | | | | | | X | | X | | X | |
| 1 Fast | X | | X | | X | | | | | | | | | | | | X |
| 2 Fast | X | | | X | | X | | | | | | | | | | | X |
| 3 Fast | X | | X | | | | X | | | | | | X | | | | X |
| 4 Fast | X | | | X | | | | X | | | | | X | | | | X |
| 5 Fast | X | | X | | | | | | X | | | | X | X | | | X |
| 6 Fast | X | | | X | | | | | | X | | | X | X | | | X |
| 7 Fast | X | | X | | | | | | | | X | | X | X | | | X |
| 8 Fast | X | | | X | | | | | | | | X | X | X | | | X |

FIG. 6A

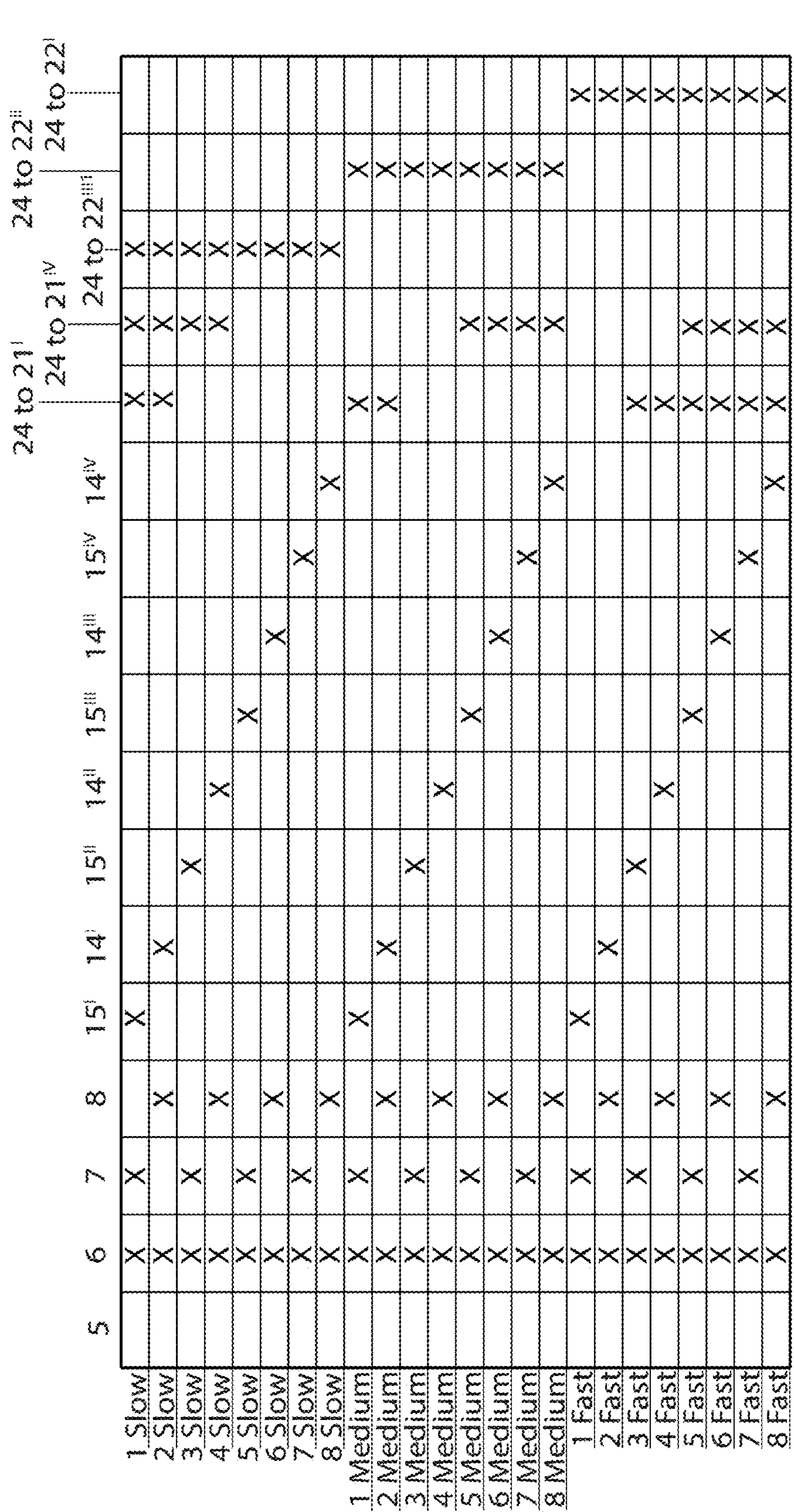

| | 5 | 6 | 7 | 8 | $15^{I}$ | $14^{I}$ | $15^{II}$ | $14^{II}$ | $15^{III}$ | $14^{III}$ | $15^{IV}$ | $14^{IV}$ | 24 to $21^{I}$ | 24 to $21^{IV}$ | 24 to $22^{IIII}$ | 24 to $22^{II}$ | 24 to $22^{I}$ |
|---|---|---|---|---|---|---|---|---|---|---|---|---|---|---|---|---|---|
| 1 Slow | | X | X | | X | | | | | | | | X | X | X | | |
| 2 Slow | | X | | X | | X | | | | | | | X | X | X | | |
| 3 Slow | | X | X | | | | X | | | | | | | X | X | | |
| 4 Slow | | X | | X | | | | X | | | | | | X | X | | |
| 5 Slow | | X | X | | | | | | X | | | | | | X | | |
| 6 Slow | | X | | X | | | | | | X | | | | | X | | |
| 7 Slow | | X | X | | | | | | | | X | | | | X | | |
| 8 Slow | | X | | X | | | | | | | | X | | | X | | |
| 1 Medium | | X | X | | X | | | | | | | | X | | | X | |
| 2 Medium | | X | | X | | X | | | | | | | X | | | X | |
| 3 Medium | | X | X | | | | X | | | | | | | | | X | |
| 4 Medium | | X | | X | | | | X | | | | | | | | X | |
| 5 Medium | | X | X | | | | | | X | | | | | X | | X | |
| 6 Medium | | X | | X | | | | | | X | | | | X | | X | |
| 7 Medium | | X | X | | | | | | | | X | | | X | | X | |
| 8 Medium | | X | | X | | | | | | | | X | | X | | X | |
| 1 Fast | | X | X | | X | | | | | | | | | | | | X |
| 2 Fast | | X | | X | | X | | | | | | | | | | | X |
| 3 Fast | | X | X | | | | X | | | | | | X | | | | X |
| 4 Fast | | X | | X | | | | X | | | | | X | | | | X |
| 5 Fast | | X | X | | | | | | X | | | | X | X | | | X |
| 6 Fast | | X | | X | | | | | | X | | | X | X | | | X |
| 7 Fast | | X | X | | | | | | | | X | | X | X | | | X |
| 8 Fast | | X | | X | | | | | | | | X | X | X | | | X |

FIG. 6B

DUAL CLUTCH TRANSMISSION ARCHITECTURE FOR AGRICULTURAL VEHICLES

CROSS-REFERENCE TO RELATED APPLICATIONS

The present application is the U.S. National Stage of International Application No. PCT/EP2023/055171, filed Mar. 1, 2023, which claims priority to Italian Patent Application No. 102022000003782, filed Mar. 1, 2022.

TECHNICAL FIELD

The present invention relates to a dual clutch transmission architecture, in particular a dual clutch transmission architecture for an off road vehicle such as an agricultural vehicle and to a related method for controlling the gear shifting of such dual clutch transmission.

BACKGROUND OF THE INVENTION

Transmissions for off road vehicles such as agricultural vehicles offer different configuration, for instance:

- manual shifted transmissions, in which all gears of the transmissions are engaged directly by the driver through lever mechanisms which command clutches, synchronizers and dog clutches to select the gear;
- semi-powershift transmission, in which some gears are engaged, manually or automatically, thanks to servo actuated mechanisms in powershift mode, i.e. by swapping the torque by a couple of clutches, and in which other gears are actuated by lever mechanisms which commands clutches, synchronizers and dog clutches to select the gear or by a servo-actuated mechanism which is not in powershift mode, i.e. which uses a single clutch and, when such clutch is opened, torque cannot pass through the transmission; and
- full powershift transmission, in which all gears of the transmission are engaged through servo actuated mechanism in powershift mode.

An important request that must be satisfied in modern mechanical transmission for agricultural vehicles is to have high efficiency across the full ground speed range, in order to improve the vehicle fuel consumption. In this respect a large use of wet clutches to build the semi-powershift or the full-powershift transmissions, generates more power losses inside the transmission when compared to the use of synchronizers and dog-clutches and, as consequence, a penalty of efficiency as consequence.

For this reason, in the art, the dual-clutch transmission, DCT, architecture is considered the most valuable layout for powershift transmissions in order to satisfy all the previous demands:

- it provides an high number of speed ratios with a mechanism that allow for a comfortable powershift (by swapping one couple of clutches); and
- it performs high efficiency, because a powershift layout is provided by only few couples of wet clutches accompanied by many synchronizers and dog-clutches.

Because of these advantages, recently DCT architecture has been applied in the field of the transmissions for agricultural vehicles. An example of such DCT architecture is disclosed in patent document WO2019091953 A1.

However such known architectures used big wet clutches that dissipate a considerable amount of energy, in particular for allowing shift between range gears.

Moreover, during shifting between gear ratio or range gear ratio, the inertia of the carried transmission elements is considerable. Therefore resistant torque is high and the fuel consumption is not neglectable during shifting.

In conclusion, the need is felt to improve existing DCT architecture for agricultural vehicle in order to improve their performances in all its working speed ranges and to improve the comfort during all gears shifting.

Aim of the present invention is to satisfy the above mentioned needs in a cost-effective and optimized way.

SUMMARY OF THE INVENTION

The aforementioned aim is reached by an architecture for a dual clutch transmission and a related control method as claimed in the appended set of claims.

BRIEF DESCRIPTION OF THE DRAWINGS

For a better understanding of the present invention, a preferred embodiment is described in the following, by way of a non-limiting example, with reference to the attached drawings wherein:

FIGS. 6A, 6B are tables indicating the activation of elements of the transmission architecture according to the invention.

DETAILED DESCRIPTION OF THE INVENTION

Figure 1:
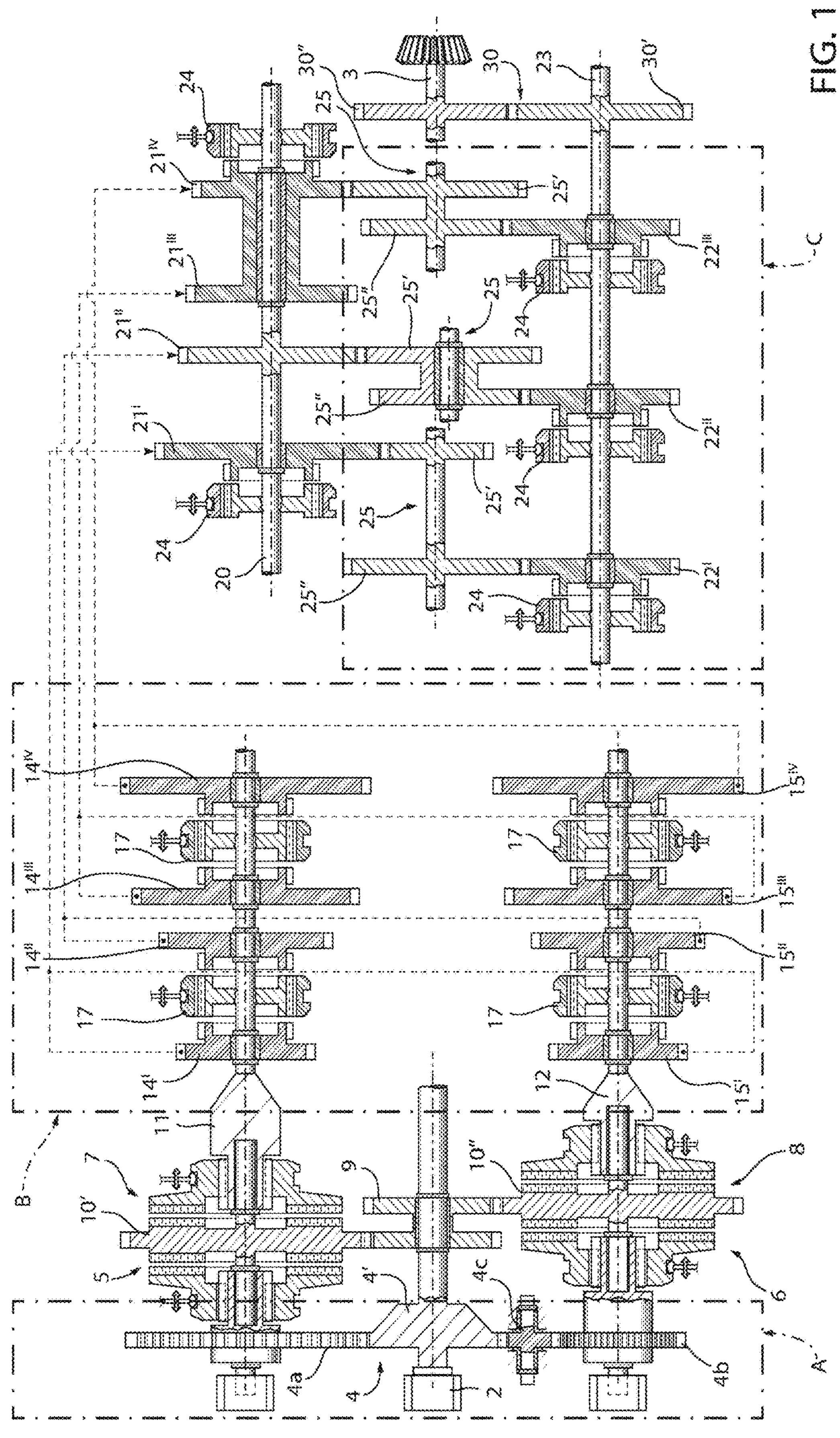
FIG. 1 is a schematic representation of a dual clutch transmission architecture according to the present invention.

FIG. 1 discloses a dual clutch transmission 1, in the following "transmission", for an off road vehicle, such as an agricultural vehicle, e.g. a tractor (not illustrated), comprising an engine input shaft 2, operatively connected to a torque source (not shown), such as an internal combustion engine of the work vehicle, and an output shaft 3, which can be coupled to a drive axle of the off road vehicle.

The transmission 1 essentially comprises, operatively connected in series one to the other between input shaft 2 and output shaft 3, an input stage A, a gear ratio stage B and a range gear ratio stage C.

The input stage A may be realized in different manner to provide torque to a first main clutch 5, hereinafter "forward clutch", and torque in reversed direction to a second main clutch 6, hereinafter "rearward clutch", both carried by the engine input shaft 2.

In disclosed exemplarily embodiment, input stage A comprises a gearing 4 comprising a first wheel 4' configured to mesh with a first wheel 4*a* rotatably fixed to the forward clutch 5 and to a third wheel 4*c* configured to engage a second wheel 4*b* rotatably fixed to the rearward clutch 6.

As per se known, the forward clutch 5 couples the engine input shaft 2 to the output shaft 3 in order to allow a forward motion of the work vehicle while the rearward clutch 6 couples the engine input shaft 2 to the output shaft 3 in order to allow a rearward motion of the work vehicle. In the disclosed exemplarily embodiment, such occurrence is given by the peculiar construction of gearing 4 as described above.

Transmission 1 further comprise a first clutch 7, hereinafter "even clutch", and a second clutch 8, hereinafter "odd clutch". The even clutch 7 is configured to couple a first auxiliary shaft 11, hereinafter "even shaft", with the forward clutch 5. The odd clutch 8 is configured to couple a first auxiliary shaft 12, hereinafter "odd shaft", with the rearward clutch 6.

Advantageously, the forward clutch 5 is coupled to the even clutch 7 by a first housing 10' and the rearward clutch 6 is coupled to the odd clutch 8 by a second housing 10". The first and the second housing 10', 10" are coupled together by an intermediate gear 9, e.g. carried in a rotatable free manner by engine input shaft 2.

Preferably the intermediate gear 9 is configured to be coupled to the first housing 10' through a first gear ratio and to be coupled to the second housing 10" through a second gear ratio. The first and the second gear ratio are preferably different.

In view of above, thanks to the coupling of the housings 10', 10" with the intermediate gear 9, the even shaft 11 may be coupled to the rearward clutch 6 and the odd shaft 12 may be coupled to the forward clutch 5 according to their actuation.

The even shaft 11 and the odd shaft 12 each comprise a plurality of selection elements 17 e.g. synchronizer or dug clutches, fixedly carried by the respective shaft 11, 12 and therefore rotate together with to these latter. Obviously selection elements 17 may comprise other equivalent connection means such as joint clutches.

The gear ratio stage B comprises a plurality of gears 14, 15 accommodated on respectively even or odd shafts 11, 12 and having a different size one with respect to the other and that are supported in a rotatable free manner the respective shaft 11, 12, e.g. by means of bearings, so that they are not forced to rotate to the same speed of the respective shaft 11, 12 when the engaging dog clutch 17 is in their neutral position.

Preferably the even shaft 11 may comprise four gears 14, namely a first gear $\mathbf{14}^{I}$ having the biggest diameter, a fourth gear $\mathbf{14}^{IV}$ having the smallest diameter and a second and third gears $\mathbf{14}^{II}$, $\mathbf{14}^{III}$ having respective diameters comprised between the ones of first and the fourth gears $\mathbf{14}^{I}$, $\mathbf{14}^{IV}$.

Similarly, the odd shaft 12 may comprise four gears 15, namely a first gear $\mathbf{15}^{I}$ having the biggest diameter, a fourth gear $\mathbf{15}^{IV}$ having the smallest diameter and a second and third gears $\mathbf{15}^{II}$, $\mathbf{15}^{III}$ having respective diameters comprised between the ones of first and the fourth gears $\mathbf{15}^{I}$, $\mathbf{15}^{IV}$.

Advantageously the gear $\mathbf{14}^{I}$ has the same diameter of gear $\mathbf{15}^{I}$, gear $\mathbf{14}^{II}$ has the same diameter of gear $\mathbf{15}^{II}$, gear $\mathbf{14}^{III}$ has the same diameter of gear $\mathbf{15}^{III}$ and gear $\mathbf{14}^{IV}$ has the same diameter of gear $\mathbf{15}^{IV}$.

The gears of gears sets 14, 15, when selected, represent the different speed ratios of the transmission; namely first speed ratio selecting gear $\mathbf{15}^{I}$, second speed ratio selecting gear $\mathbf{14}^{I}$, third speed ratio selecting gear $\mathbf{15}^{II}$, fourth speed ratio selecting gear $\mathbf{14}^{II}$, fifth speed ratio selecting gear $\mathbf{15}^{III}$, sixth speed ratio selecting gear $\mathbf{14}^{III}$, seventh speed ratio selecting gear $\mathbf{15}^{IV}$ or eighth speed ratio selecting gear $\mathbf{14}^{IV}$.

As said above, gears of the gears sets 14, 15 may be selected by a dog clutch 17 configured to couple the shaft with the chosen gear. Preferably the even shaft 11 may comprise two dog clutches 17 interposed respectively between the gear $\mathbf{14}^{I}$-$\mathbf{14}^{II}$ and $\mathbf{14}^{III}$-$\mathbf{14}^{IV}$. Similarly the odd shaft 12 may comprise two dog clutches 17 interposed respectively between the gear $\mathbf{15}^{I}$-$\mathbf{15}^{II}$ and $\mathbf{15}^{III}$-$\mathbf{15}^{IV}$.

The transmission 1 further comprises an intermediate shaft 20 configured to engage with gear wheels 14, 15 and with gear range stage C. In particular, the intermediate shaft 20 is configured to carry a number of wheels 21 corresponding to the wheels of the gear ratio stage B.

It is noticed, even if visually schematized, that the intermediate shaft 20 is preferably arranged vertically adjacent, i.e. over/below, the even and odd shafts 11, 12 in order to provide a compact arrangement of the transmission 1.

Accordingly, intermediate shaft carries a first wheel $\mathbf{21}^{I}$, a second wheel $\mathbf{21}^{II}$, a third wheel $\mathbf{21}^{III}$ and a fourth wheel $\mathbf{21}^{IV}$.

The gear range stage C is configured to engage a number of the wheels 21 carried by intermediate shaft 20 to the output shaft 3 by choosing among a plurality of gear ratios, defined by respective range gears 22, which are multiplied by the gear ratio of gear ratio stage B.

In the disclosed exemplarily embodiment, the gear range stage G comprises a first range gear $\mathbf{22}^{I}$ called "low" range, a second range gear $\mathbf{22}^{II}$ "medium" range, and a third range gear $\mathbf{22}^{III}$ called "fast"; the three range gears have different dimensions. In this way, the transmission provides twenty four possible gear ratios, due to the eight gear ratios repeated over the three range gear ratios.

According to the invention, the gear ratio wheels 22 are all carried in a rotatably free manner on a support shaft 23 and selectively engageable in rotation to this latter thanks to selection means 24 preferably design are semi-synchronizers.

Consequently, some of the wheels 21 carried by intermediate shaft 20 are carried in in a rotatably free manner on this latter and selectively engageable in rotation to this latter thanks to the aforementioned selection means 24.

The selection means 24 are controlled in order to allow a power shift change during gear shifting between gear wheels 14, 15 and/or range gear wheels 22 as detailed below.

In particular, the support shaft 23 is coupled to output shaft 3, e.g. via a gearing 30 comprising a first gear 30' rigidly carried to the support shaft 23 and a second gear 30" rigidly carried by output shaft 3.

In the disclosed embodiment, a pair of wheels 21 are carried in a rotatably free manner with respect to the intermediate shaft 20 and carrying respective range gears 22, in particular first wheel $\mathbf{21}^{I}$ carries first range gear 221 and fourth wheel $\mathbf{21}^{IV}$ carries third range gear $\mathbf{22}^{III}$.

One of the wheel 21 is instead carried in a fixed manner with respect to intermediate shaft 20 and carries one range gear 22; in particular, second wheel $\mathbf{21}^{I}$ carries second range gear $\mathbf{22}^{II}$.

The exceeding wheels of wheels 21 are preferably rotationally engaged with one of the wheels 21 carried in free manner by intermediate shaft 20. In particular, in the disclosed arrangement, third wheel $\mathbf{21}^{III}$ is rotationally fixed with respect to fourth wheel $\mathbf{21}^{IV}$, i.e. they are carried by the same support that freely rotates on intermediate shaft 20.

Preferably, according to the shown embodiment, the wheels 21 are operatively connected to range gear wheels 22 via idler wheels 25. In particular, according to the above, each gear wheel 21 coupler to range gear wheel 22 is coupled by a respective idler wheel 25.

Preferably, each idler wheel 25 comprises a first wheel 25' configured to engage with a respective gear wheel 21 and a second wheel 25" configured to engage with a respective range gear wheel 22.

The above described clutches 5, 6, 7, 8, selection elements 17 and selection means 24 can be selected by respective actuators (not shown) that are controlled by an electronic control unit (not shown). The electronic control unit controls said clutches or said electronic motors by sending control electric signals directed to the respective clutches or motors to be controlled.

Electronic control unit can be either the ECU of the vehicle or driveline ECU of the vehicle. The electronic unit is configured to control the above cited elements of the transmission 1 as per direct input command of the user of the vehicle or in automatic way following the shift control logic deployed into a specific software code, which can be memorized into the electronic unit.

The operation of the transmission 1 according to the invention are described in the following.

In particular, the operation is described making the assumption that the transmission 1 is providing torque to output shaft 3 in the "first slow" gear ratio.

Figure 2:
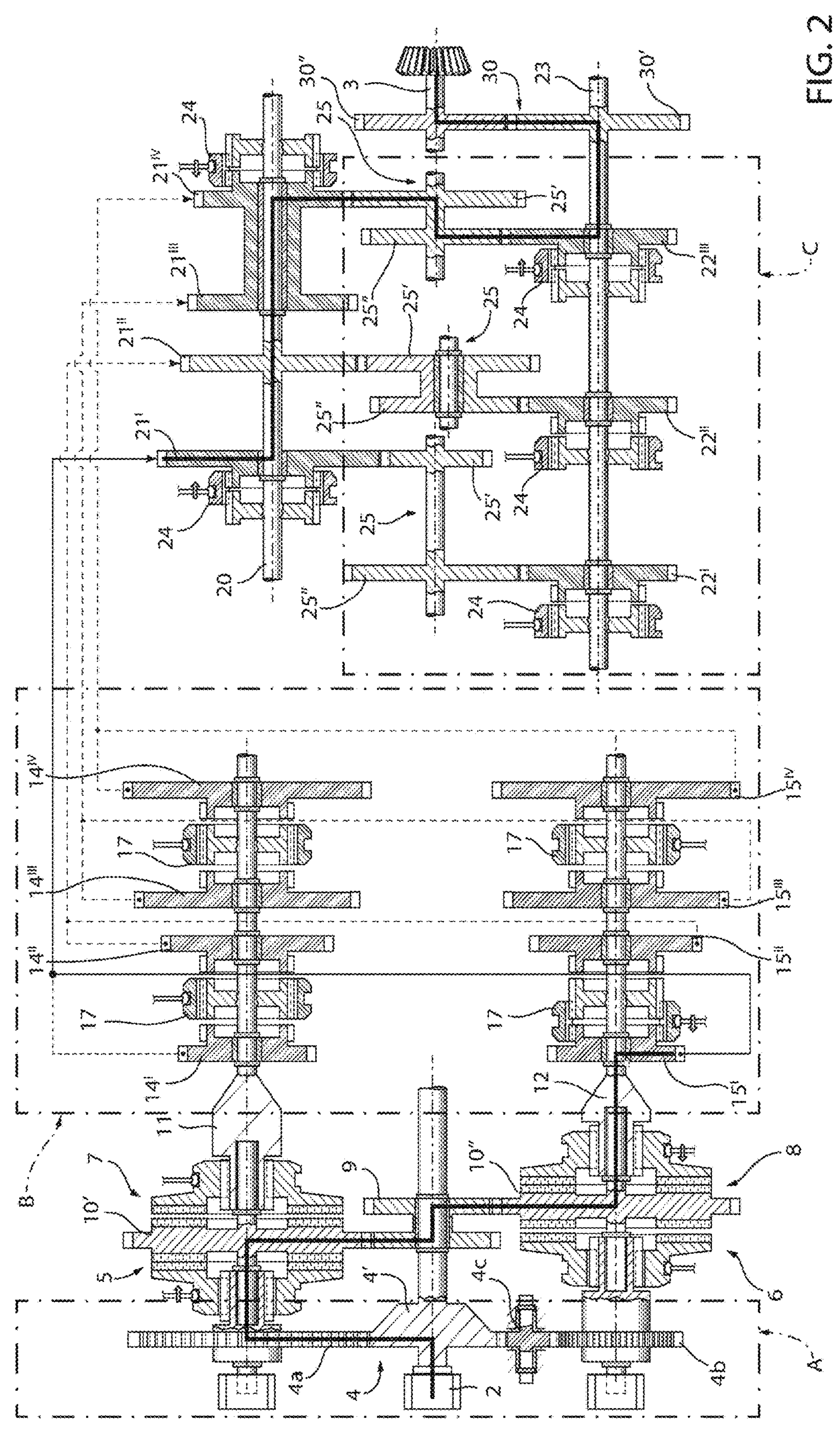
FIGS. 2 to 5 are schematic representations of the dual clutch transmission architecture of FIG. 1 in different operational conditions.

In a first example of operation, shown in FIG. 2, it is represented a standard operation in "first slow". In such configuration, the torque provided by input stage A passes through forward clutch 5, odd clutch 8 to odd shaft 12. First gear wheel $\mathbf{15}^{I}$ is engaged via selection elements 17 and therefore transmits torque to the first wheel $\mathbf{21}^{I}$ that is engaged via selection means 24 to the intermediate shaft 20. On the opposite side, selection means 24 couple the fourth wheel $\mathbf{21}^{IV}$ to the intermediate shaft 20 and torque is transmitted, via idle wheel 25, towards third range gear wheel $\mathbf{22}^{III}$ that is coupled to the support shaft 23 via selection means 24. Then, thanks to gearing 25 the torque is provided to the output shaft 3.

Figure 3:
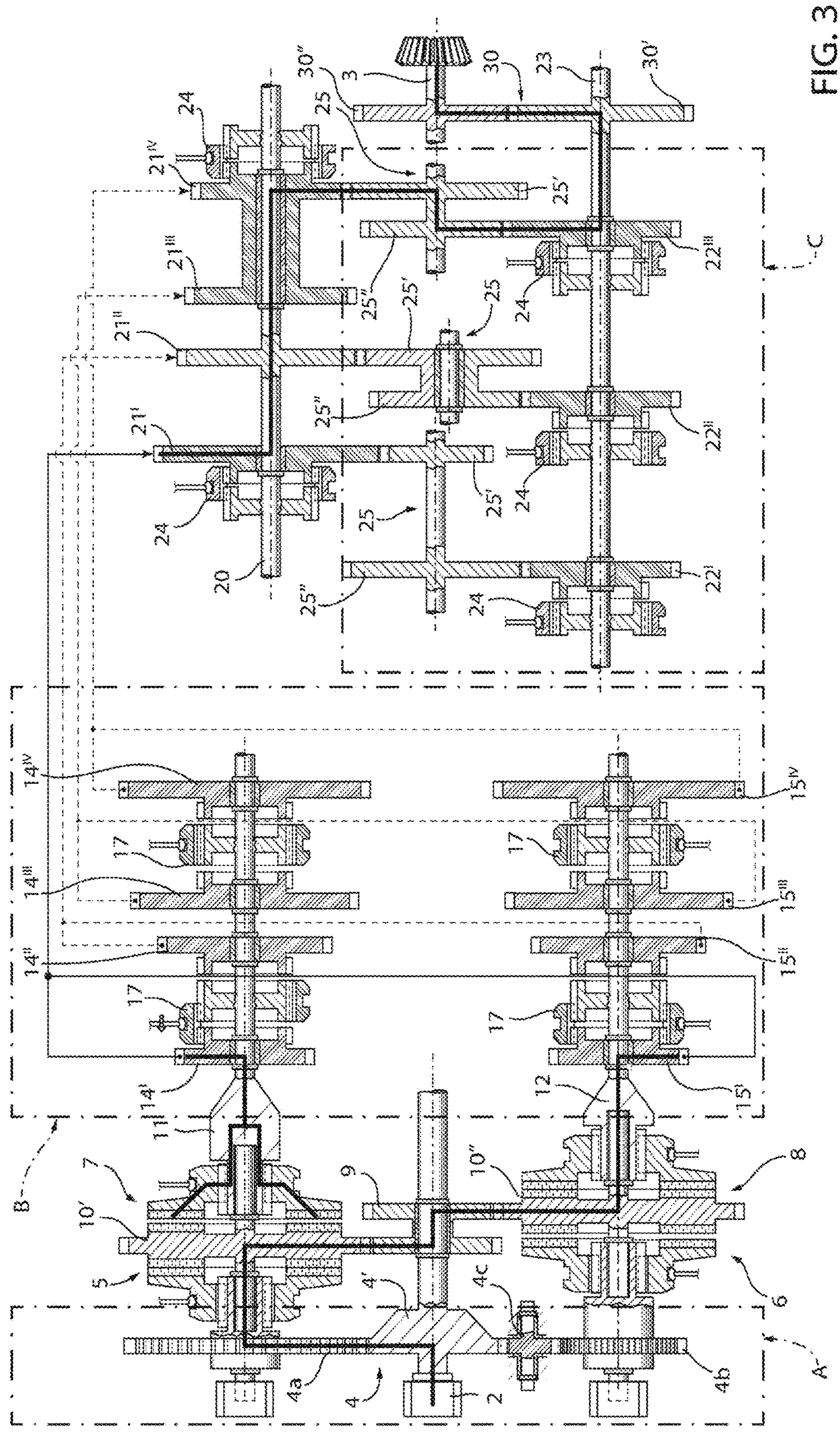
Figure 4:
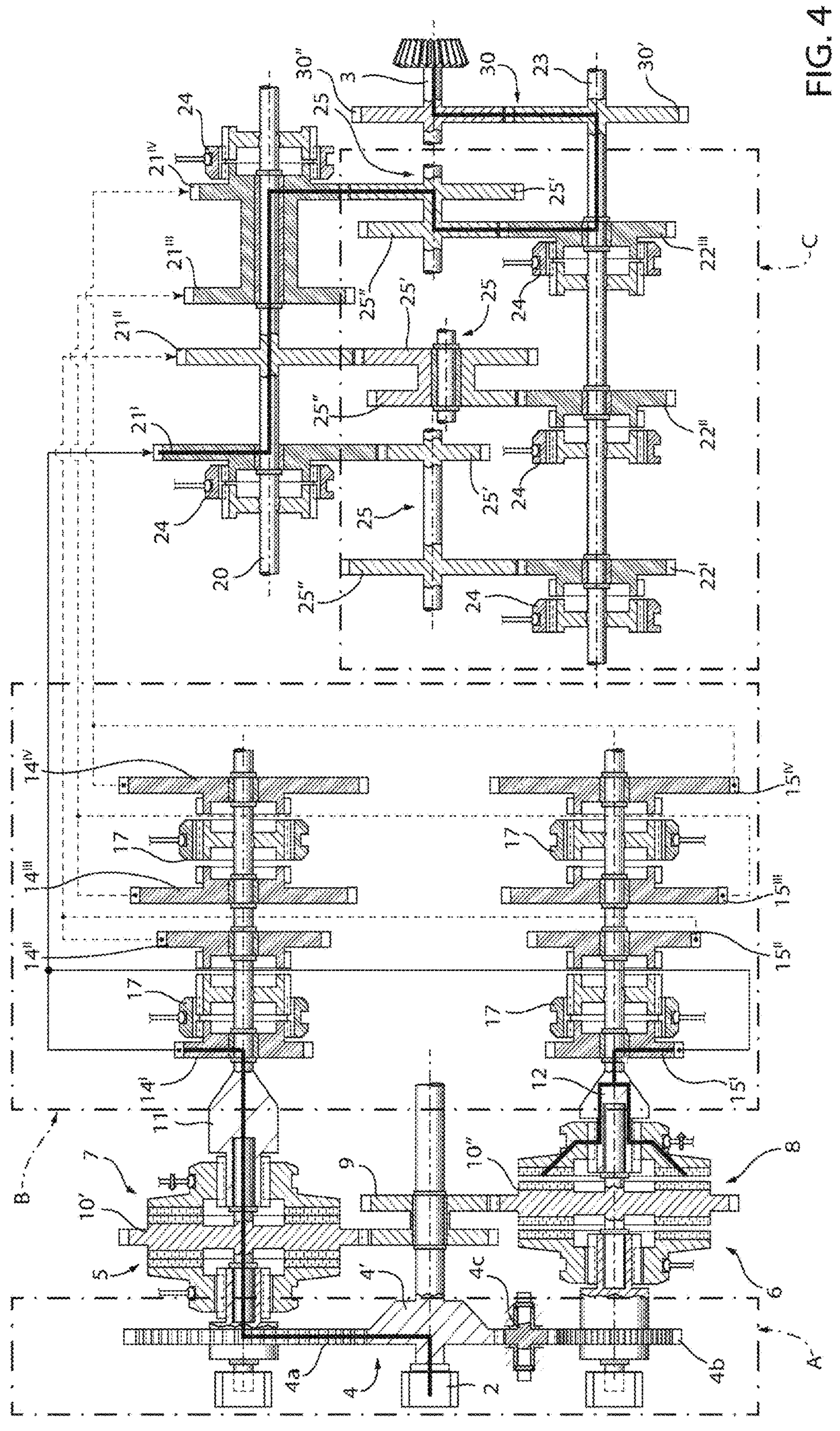
Figure 5:
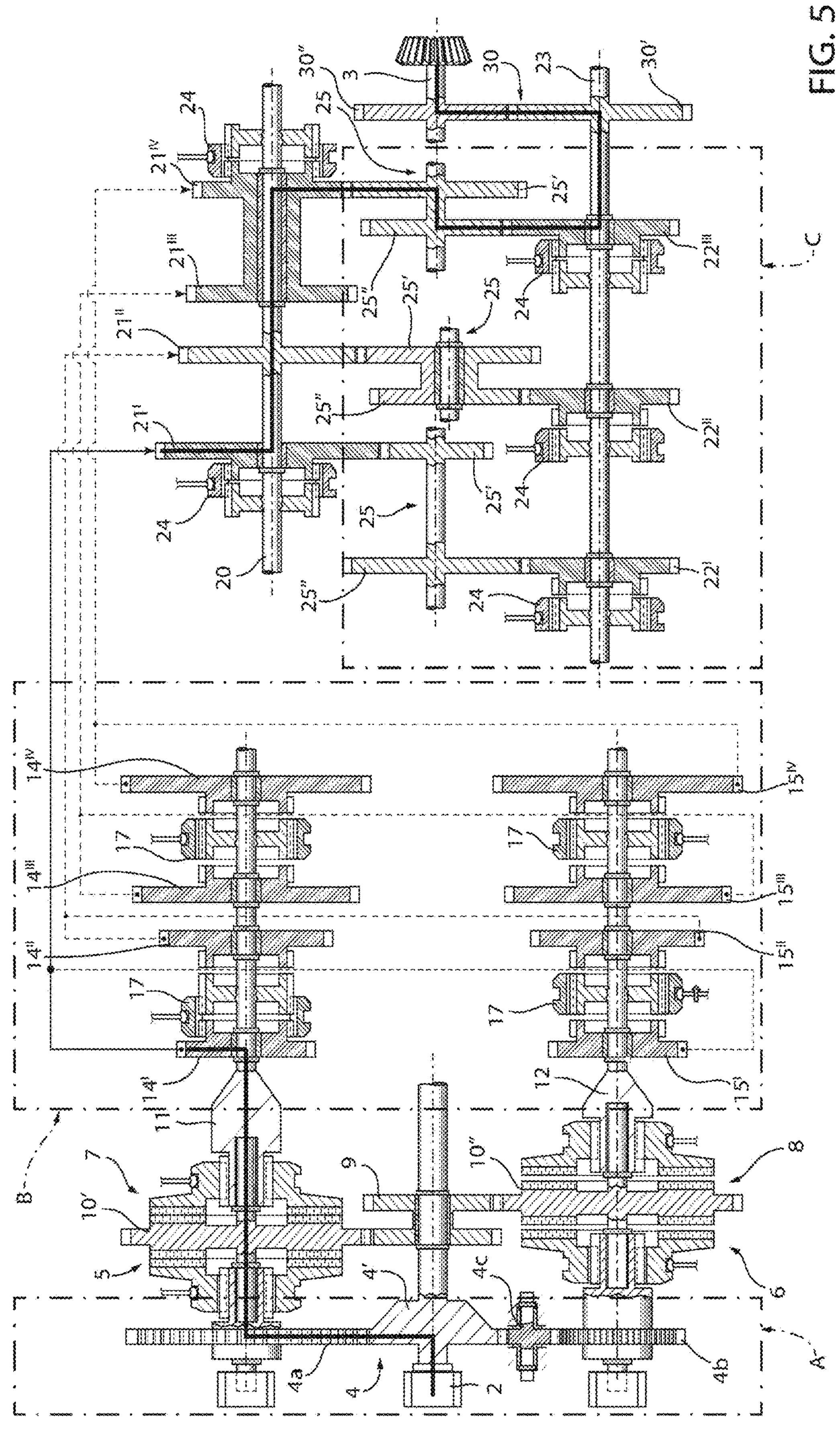

In a second example of operation, shown in FIGS. 3 to 5, it is shown a gearshift operation from, for instance, first slow to second slow. In the initial condition, the torque flows as above described making reference to FIG. 2. Then, the selection element 17 associated to wheel $\mathbf{14}^{I}$ connects this latter so that the even shaft 11 is make rotate (FIG. 3). Accordingly, the clutches 7, 8 are swapped, as per se known, so that the torque passes from even clutch 7 to wheel $\mathbf{14}^{I}$ and then downstream to range stage C (FIG. 4). When swapping is complete, than the wheel $\mathbf{15}^{I}$ is disengaged by the associated selection element 17.

In a third example of operation, not shown in figures, it is described an upshift between to eight slow to first medium. In the initial condition, the torque flows from even shaft 11/wheel $\mathbf{14}^{IV}$ to range stage C passing via gear $\mathbf{21}^{IV}$ that free to rotate and makes rotate via idler gear 25 the wheel $\mathbf{22}^{III}$ that is coupled to support shaft 23.

Then, the wheels $\mathbf{22}^{II}$ and $\mathbf{14}^{I}$ are engaged via selection means 24/element 17 thereby allowing odd shaft 12 and intermediate shaft 20 rotate. Accordingly, clutches 8, 7 are swapped and torque passes through the new path defined by wheels $\mathbf{14}^{I}$ and range gear $\mathbf{22}^{II}$ via idler gear 25. When swapping is complete, wheels $\mathbf{15}^{IV}$ and $\mathbf{22}^{III}$ are disengage from the respective shafts 11, 23.

The vehicle may be provided by a dedicated control software code in the ECU of the transmission configured to recognize signals from sensors installed on the vehicle, e.g. the torque demand at the output shaft 3 and the speed of the engine input shaft 2, and automatically define the gearshift without any user intervention.

The invention also relates to a method for operating a transmission 1 as described above for shifting from a gear 14, 15 of a gear ratio stage B in combination a gear 22 of range gear stage C to a further gear 14, 15 of the gear ratio stage B in combination the gear 22 of range gear stage C:

- receiving an input for shifting from an initial gear 14, 15 of the gear ratio stage B in combination with an initial gear 22 of range gear stage C to a further gear 14, 15 of the gear ratio stage B in combination with the same and/or a further gear 22 of the range gear stage C;
- coupling the further gear 14, 15 with the respective shaft 11, 12 if the same range gear 22 is requested otherwise coupling the further gear 14, 15 with the respective shaft 11, 12 and the further gear 22 to the support shaft 23;
- swapping even and odd clutches 7, 8 thereby allowing torque to flow from the clutch 7, 8 associated to the initial gear 14, 15 to the clutch 7, 8 associated to the further gear 14, 15;
- uncoupling the initial gear 14, 15 from the respective shaft 11, 12 if the same range gear 22 is requested otherwise uncoupling the initial gear 14, 15 from the respective shaft 11, 12 and the initial gear 22 from the support shaft 23.

In view of the foregoing, the advantages of a dual clutch transmission 1 according to the invention and the related method are apparent.

The transmission architecture 1 according to the invention increases the efficiency of the system. Indeed, the power losses due to the presence of clutches to allow power-shift between range gears is avoided.

Furthermore, the use of semi-synchronizers as selection means 24 provides a very compact and economic arrangement for coupling or uncoupling the support shaft gear wheels and range gear wheels.

It is furthermore noticed, that the range gear wheels may be designed smaller since the inertia carried by the range gear wheel is smaller with respect to known transmission architecture. Indeed the torque is split into different paths thanks to the specific arrangement of wheels on the intermediate shaft 20 and of the range wheels on the support shaft 23.

Since the clutch in range gears is not present and since the range gear wheels are smaller, the overall dimensions of the transmission 1 is more compact with respect to known architectures.

It is clear that modifications can be applied to the described transmission 1 which do not extend beyond the scope of protection defined by the claims.

For example, the number and typology of gears of gear ratio, range and idler gears may be varied according to vehicle necessity.

Further, the transmission may comprise different elements with respect to the described one, e.g. the number and/or typologies of clutches, gears and dog clutches may be varied. Accordingly, input stage A may be realized in any convenient manner.

Moreover, the control and typology of selection elements/means 17, 24 may be implemented with any typology of control, e.g. a hydraulic, electric or pneumatic in alternative or in combinations.

The invention claimed is:

1. An architecture for a dual clutch transmission for a work vehicle, the dual clutch transmission comprising:

- an input shaft coupled to a power source of the work vehicle;
- an output shaft coupled to a driving axle of the work vehicle;
- an input stage, a gear ratio stage, and a range gear ratio stage operatively connected in series with respect to the input shaft and the output shaft;
- a forward clutch and a rearward clutch;
- wherein the input stage is configured to transmit torque from the input shaft to the forward clutch and the rearward clutch;
- wherein the gear ratio stage comprises a first shaft configured to carry a first plurality of gears in a rotatably free manner, and a second shaft configured to carry a second plurality of gears in a rotatably free manner, the first shaft coupled to the forward clutch via a first clutch, and the second shaft coupled to the rearward clutch via a second clutch;

an intermediate shaft operatively interposed between the gear ratio stage and the range gear ratio stage;

the intermediate shaft carrying a third plurality of gears configured to engage the first plurality of gears and the second plurality of gears to provide a predetermined gear ratio between the input shaft and the intermediate shaft;

the range gear ratio stage comprising a support shaft carrying a plurality of range gears, the plurality of range gears being configured to engage one or more of the third plurality of gears carried by the intermediate shaft, the support shaft being operatively coupled to the output shaft;

wherein the plurality of range gears are carried in a rotatably free manner with respect to the support shaft and wherein one or more freely rotatable gears of the third plurality of gears are supported in a rotatably free manner on the intermediate shaft, and at least one gear of the third plurality of gears is carried by the intermediate shaft in a rigid manner; and a first selection element configured to selectively couple the first plurality of gears to the second plurality of gears, and a second selection element configured to selectively couple the plurality of range gears to the support shaft and the one or more freely rotatable gears of the third plurality of gears to the intermediate shaft.

2. The architecture of claim 1, wherein the third plurality of gears carried by the intermediate shaft are equal in number to the number of the first plurality of gears.

3. The architecture of claim 1, wherein the intermediate shaft is adjacent with respect to the first shaft and the second shaft.

4. The architecture of claim 1, wherein the third plurality of gears carried by the intermediate shaft are coupled to the plurality of range gears by an idler gearing.

5. The architecture of claim 4, wherein the idler gearing comprises a first gear engaged with a respective gear carried by the intermediate shaft and a second gear engaged with a respective range gear carried by the support shaft.

6. The architecture of claim 1, wherein the first selection element comprises at least one of a synchronizer or a dog clutch.

7. The architecture of claim 1, wherein the second selection element comprises at least one of a synchronizer or a dog clutch.

8. The architecture of claim 1, further comprising a control unit configured to control actuators configured to regulate operation of the forward clutch and the rearward clutch, the first selection element, and the second selection element.

9. A method for controlling an architecture for a dual clutch transmission of a work vehicle, comprising:

receiving an input for shifting from a first gear of a gear ratio stage in combination with a second gear of a range gear ratio stage to a third gear of the gear ratio stage in combination with a fourth gear of the range gear ratio stage;

wherein the dual clutch transmission comprises:

an input shaft coupled to a power source of the work vehicle;

an output shaft coupled to a driving axle of the work vehicle;

an input stage, the gear ratio stage, and the range gear ratio stage operatively connected in series with respect to the input shaft and the output shaft;

a forward clutch and a rearward clutch;

wherein the input stage is configured to transmit torque from the input shaft to the forward clutch and the rearward clutch;

wherein the gear ratio stage comprises a first shaft configured to carry a first plurality of gears in a rotatably free manner, and a second shaft configured to carry a second plurality of gears in a rotatably free manner, the first shaft coupled to the forward clutch via a first clutch, and the second shaft coupled to the rearward clutch via a second clutch;

an intermediate shaft operatively interposed between the gear ratio stage and the range gear ratio stage;

the intermediate shaft carrying a third plurality of gears configured to engage the first plurality of gears and the second plurality of gears to provide a predetermined gear ratio between the input shaft and the intermediate shaft;

the range gear ratio stage comprising a support shaft carrying a plurality of range gears, the plurality of range gears being configured to engage one or more of the third plurality of gears carried by the intermediate shaft, the support shaft being operatively coupled to the output shaft;

wherein the plurality of range gears are carried in a rotatably free manner with respect to the support shaft and wherein one or more freely rotatable gears of the third plurality of gears are supported in a rotatably free manner on the intermediate shaft, and at least one gear of the third plurality of gears is carried by the intermediate shaft in a rigid manner; and a first selection element configured to selectively couple the first plurality of gears to the second plurality of gears, and a second selection element configured to selectively couple the plurality of range gears to the support shaft and the one or more freely rotatable gears of the third plurality of gears to the intermediate shaft; and coupling the third gear with a respective shaft and the fourth gear to the support shaft;

swapping the first clutch and the second clutch to allow torque to flow from a clutch associated to the first gear to a clutch associated to the third gear; and uncoupling the first gear from the respective shaft and the second gear from the support shaft.

10. The method of claim 9, wherein the third plurality of gears carried by the intermediate shaft are equal in number to the number of the first plurality of gears.

11. The method of claim 9, wherein the intermediate shaft is adjacent with respect to the first shaft and the second shaft.

12. The method of claim 9, wherein the third plurality of gears carried by the intermediate shaft are coupled to the plurality of range gears by an idler gearing.

13. A system comprising:

a work vehicle; and a dual clutch transmission comprising:

an input shaft coupled to a power source of the work vehicle;

an output shaft coupled to a driving axle of the work vehicle;

an input stage, a gear ratio stage, and a range gear ratio stage operatively connected in series with respect to the input shaft and the output shaft;

a forward clutch and a rearward clutch;

wherein the input stage is configured to transmit torque from the input shaft to the forward clutch and the rearward clutch;

wherein the gear ratio stage comprises a first shaft configured to carry a first plurality of gears in a rotatably free manner, and a second shaft configured to carry a second plurality of gears in a rotatably free manner, the first shaft coupled to the forward clutch via a first clutch, and the second shaft coupled to the rearward clutch via a second clutch;

an intermediate shaft operatively interposed between the gear ratio stage and the range gear ratio stage;

the intermediate shaft carrying a third plurality of gears configured to engage the first plurality of gears and the second plurality of gears to provide a predetermined gear ratio between the input shaft and the intermediate shaft;

the range gear ratio stage comprising a support shaft carrying a plurality of range gears, the plurality of range gears being configured to engage one or more of the third plurality of gears carried by the intermediate shaft, the support shaft being operatively coupled to the output shaft;

wherein the plurality of range gears are carried in a rotatably free manner with respect to the support shaft and wherein one or more freely rotatable gears of the third plurality of gears are supported in a rotatably free manner on the intermediate shaft, and at least one gear of the third plurality of gears is carried by the intermediate shaft in a rigid manner; and a first selection element configured to selectively couple the first plurality of gears to the second plurality of gears, and a second selection element configured to selectively couple the plurality of range gears to the support shaft and the one or more freely rotatable gears of the third plurality of gears to the intermediate shaft.

14. The system of claim 13, wherein the third plurality of gears carried by the intermediate shaft are equal in number to the number of the first plurality of gears.

15. The system of claim 13, wherein the intermediate shaft is adjacent with respect to the first shaft and the second shaft.

16. The system of claim 13, wherein the third plurality of gears carried by the intermediate shaft are coupled to the plurality of range gears by an idler gearing.

17. The system of claim 16, wherein the idler gearing comprises a first gear engaged with a respective gear carried by the intermediate shaft and a second gear engaged with a respective range gear carried by the support shaft.

18. The system of claim 13, wherein the first selection element comprises at least one of a synchronizer or a dog clutch.

19. The system of claim 13, wherein the second selection element comprises at least one of a synchronizer or a dog clutch.

20. The system of claim 13, further comprising a control unit configured to control actuators configured to regulate operation of the forward clutch and the rearward clutch, the first selection element, and the second selection element.

* * * * *